(12) United States Patent
Zhang

(10) Patent No.: US 12,415,379 B1
(45) Date of Patent: Sep. 16, 2025

(54) HUBCAP CENTRAL LOCKING MECHANISM

(71) Applicant: SHENZHEN MICROGRAVITY TECHNOLOGY CO., LTD, Guangdong (CN)

(72) Inventor: Shuai Zhang, Guangdong (CN)

(73) Assignee: SHENZHEN MICROGRAVITY TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/975,141

(22) Filed: Dec. 10, 2024

(30) Foreign Application Priority Data

Aug. 7, 2024 (CN) .......................... 202421905856.9

(51) Int. Cl.
| | |
|---|---|
| *B60B 7/06* | (2006.01) |
| *B60B 7/00* | (2006.01) |
| *B60B 7/04* | (2006.01) |
| *B60B 7/14* | (2006.01) |

(52) U.S. Cl.
CPC ............ *B60B 7/066* (2013.01); *B60B 7/0053* (2013.01); *B60B 7/04* (2013.01); *B60B 7/14* (2013.01)

(58) Field of Classification Search
CPC .......... B60B 7/0053; B60B 7/04; B60B 7/06; B60B 7/066; B60B 7/14
See application file for complete search history.

(56) References Cited

U.S. PATENT DOCUMENTS

| | | | | | |
|---|---|---|---|---|---|
| 1,857,659 | A | * | 5/1932 | Reid ..................... | B60B 7/0013 |
| | | | | | 301/108.1 |
| 4,040,672 | A | * | 8/1977 | Imahashi .................. | B60B 7/08 |
| | | | | | 301/108.3 |
| 2005/0179311 | A1 | * | 8/2005 | Barney ................... | B60B 7/068 |
| | | | | | 301/37.35 |
| 2018/0065408 | A1 | * | 3/2018 | Wang ........................ | B60B 7/04 |
| 2020/0331289 | A1 | * | 10/2020 | Ravelo ...................... | B60B 7/14 |

* cited by examiner

*Primary Examiner* — S. Joseph Morano
*Assistant Examiner* — Emily G. Castonguay
(74) *Attorney, Agent, or Firm* — HOWARD M COHN and Associates, LLC

(57) ABSTRACT

A hubcap central locking mechanism which includes a hubcap, a hubcap locking member and a decorative cover. The hubcap includes a built-in screw connecting with a interlinked pressing member for fixedly installing an outer supporting member; a primary member of central locking mechanism is installed on the outer surface of a side wall of the outer supporting member, some clamping bead holes for placing clamping beads are set at the bottom edge of the inner wall of the primary member, a side wall of the primary member of central locking mechanism is provided with threads for spirally installing the locking member of central locking mechanism, a wheel hub silicone gasket is installed at the bottom of the locking member, and a spring is installed in the middle space between the bottom of the interlinked pressing member and the top of the outer supporting member.

10 Claims, 6 Drawing Sheets

HUBCAP CENTRAL LOCKING MECHANISM

CROSS-REFERENCE TO RELATED APPLICATIONS

The present application claims the priority of Chinese Patent Application No. 202421905856.9, filed on Aug. 7, 2024, and entitled "A hubcap central locking mechanism" the disclosure of which is fully incorporated herein by reference.

TECHNICAL FIELD

The present disclosure relates to the technical field of hubcaps, in particular to a hubcap central locking mechanism.

BACKGROUND

Hubcap is a decorative covering installed on the wheel of a vehicle or truck. Hubcap is usually made of plastic, metal or other hard materials, which aims to improve the aesthetics of the vehicle and provide protection thereto. The shape of hubcap is usually round or polygonal, which matches the hub of the wheel to ensure the aesthetics and stability after installation of the hubcap. Users have many criticisms and dissatisfactions to this kind of products in the market. For example, one of the criticisms is that the mounting structure of the hubcap is too simple and can't reach the level of firm installation, thus the hubcap is prone to fall off. Another one is that the hubcap is prone to scratch the wheel hub, because most of the hubcap adopts snap-in installation. In view of this, we provide a hubcap central locking mechanism in the present disclosure.

SUMMARY

The main purpose of the present disclosure is to provide a hubcap central locking mechanism to solve the problems raised in the above background technology.

In order to achieve the above purpose, the present disclosure provides the following technical scheme: A hubcap central locking mechanism comprises a hubcap, a hubcap locking member and a decorative cover, wherein the hubcap comprises a built-in screw, the screw is in threaded connection with an interlinked pressing member for fixedly installing an outer supporting member; a primary member of the central locking mechanism is installed on the outer surface of a side wall of the outer supporting member, a plurality of clamping bead holes used for placing clamping beads are set at the bottom edge of the inner wall of the primary member of the central locking mechanism, and a side wall of the primary member of the central locking mechanism is provided with threads for spirally installing the locking member of the central locking mechanism, a wheel hub silicone gasket is installed at the bottom of the locking member of the central locking mechanism, and a spring is installed in the middle space between the bottom of the interlinked pressing member and the top of the outer supporting member.

In some embodiments, the inner edge of the hubcap is provided with four annular grooves, and one or more tire silicone strips are placed in the grooves for increasing friction between the hubcap and a tire or a wheel hub, so as to prevent the hubcap from rotating during the rapid speeding of an automobile.

In some embodiments, the side of the hubcap locking member is provided with an annular groove, and a hubcap silicone gasket is placed in the annular groove to increase the friction between the hubcap locking member and the hubcap and prevent the thread from loosening when the tire vibrates.

In some embodiments, a circular hole is formed at the bottom edge of the locking member of the central locking mechanism, and a circular protrusion is formed at the top edge of the hubcap silicone gasket to match the circular hole, and the hubcap silicone gasket is used for increasing the pre-tightening force between the locking member of the central locking mechanism and the thread on the side wall of the primary member of the central locking mechanism, making the meshing between the threads more closely fitted, reducing the clearance, and increasing the friction with a wheel hub.

In some embodiments, an annular flange is provided at the bottom of the hubcap locking member, and an annular flange is provided at the opening of the top of the hubcap, and the two annular flanges have the same size and are used for fixing the hubcap firmly on a tire or a wheel hub.

In some embodiments, the number of the clamping beads is six, and the bottom of the inner wall of the primary member of the central locking mechanism is provided with six corresponding clamping bead holes, and the clamping bead holes are provided with arc-shaped openings, and the diameter of the holes is smaller than that of the clamping beads, and the clamping beads are hold in the clamping bead holes on the inner wall of the primary member of the central locking mechanism by the outer supporting member.

In some embodiments, the spring is used to enable the outer supporting member and the interlinked pressing member to rebound, and during the process of rebounding, the outer supporting member will seal the six clamping bead holes on the inner wall of the primary member of the central locking mechanism, so that the clamping bead has no room for retraction and abuts against the clamping beads to prevent the clamping beads from retracting, as a result the hubcap central locking mechanism get stuck in shaft holes on a shaft of a wheel hub.

In some embodiments, an annular-arc-shaped protrusion is form on the outer surface of the outer supporting member for pushing the clamping beads into the clamping bead holes on the inner wall of the primary member of the central locking mechanism.

In some embodiments, a chute is provided on the top end of the inner wall of the primary member of the central locking mechanism, and the chute is configured to fit the rectangular protrusion on the side wall of the interlinked pressing member and is used for fixing the position of the interlinked pressing member in the primary member of the central locking mechanism and driving the primary member of the central locking mechanism to rotate together with the interlinked pressing member when the interlinked pressing member is rotated.

In some embodiments, a threaded hole is provided at the center of the bottom of the interlinked pressing member, and a threaded through hole is provided at the center of the inner part of the outer supporting member for screwing the screw and enabling it to pass through the threaded through hole and screw together with the interlinked pressing member.

Compared with the existing similar products in the market, the present disclosure has the following advantages: firstly, because it is a quick-release structure, it is convenient to assemble, and users can complete the assembly by themselves without tending to professionals; secondly, because it is strongly fixed, it is not fixed by buckles, so there is no risk of the hubcap falling off, because the buckles have the risk of deformation and failure, and the wheels will not be scratched at the same time; thirdly, it can be used for more vehicles, and the adaptive user groups are more extensive.

BRIEF DESCRIPTION OF DRAWINGS

In order to illustrate the technical solutions of the embodiments of the present application more clearly, the following briefly introduces the accompanying drawings that need to be used in the description of the embodiments of the present application. Obviously, the drawings in the following description are only some embodiments of the present application. For those of ordinary skill in the art, other drawings can also be obtained from these drawings without creative effort.

Figure 1:
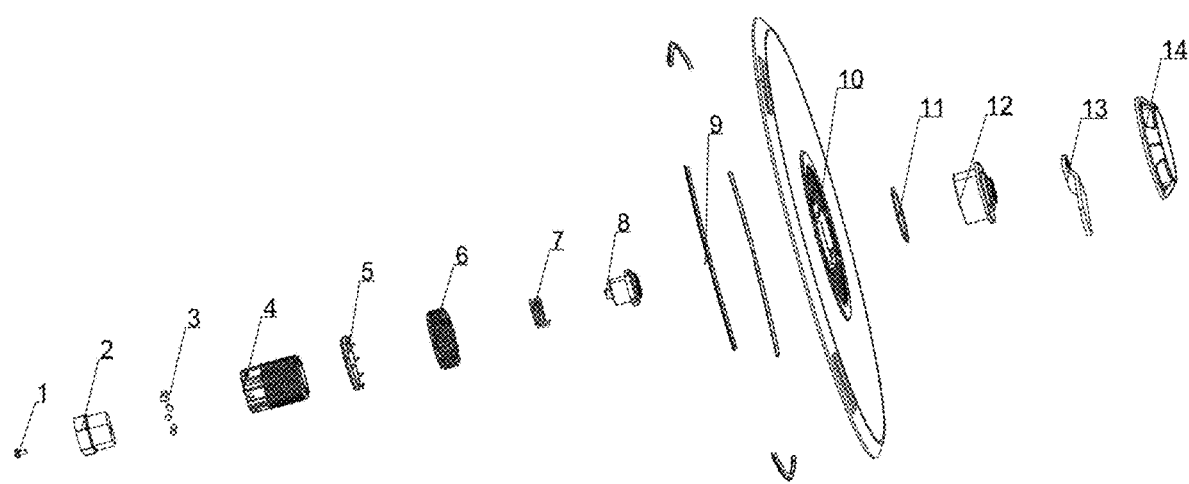
FIG. 1 is a schematic diagram of the effect of disassembling the integral structure of a hubcap central locking mechanism in a preferred embodiment of the present disclosure.
Figure 2:
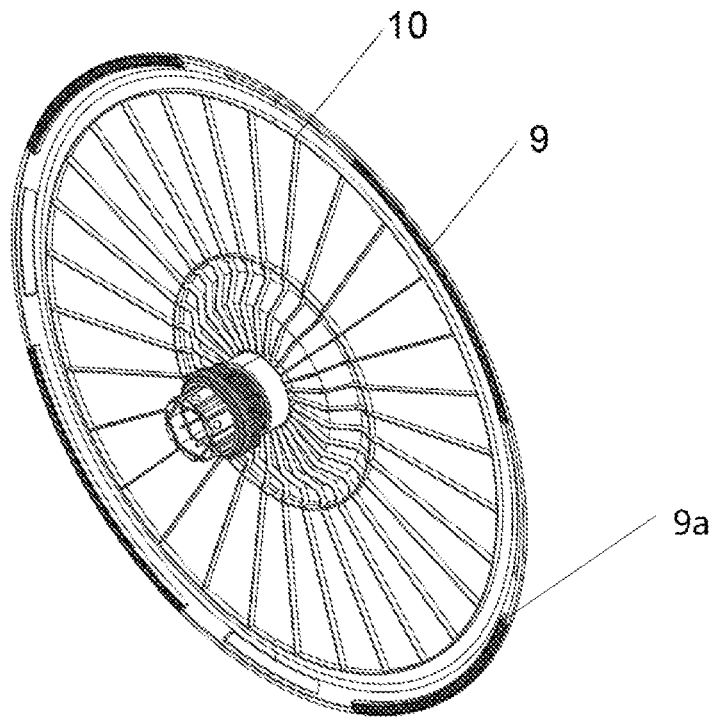
FIG. 2 is a schematic diagram of the assembly effect of the integral structure of the hubcap central locking mechanism in the preferred embodiment of the present disclosure.
Figure 3:
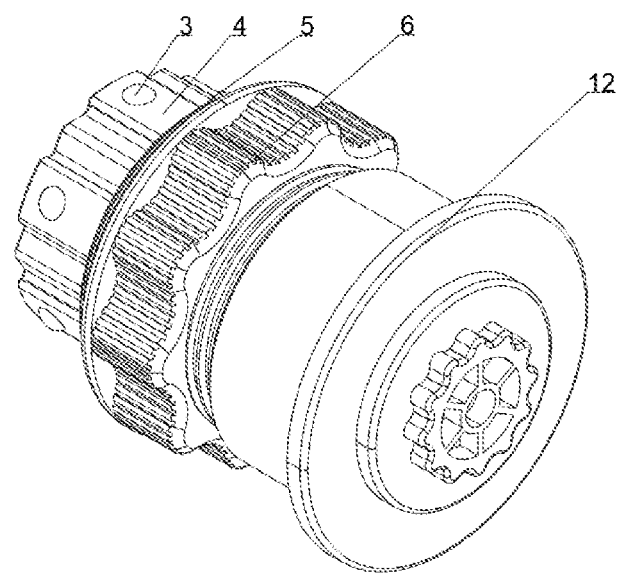
FIG. 3 is a schematic diagram showing the effect of a hubcap central locking mechanism in the preferred embodiment of the present disclosure.
Figure 4:
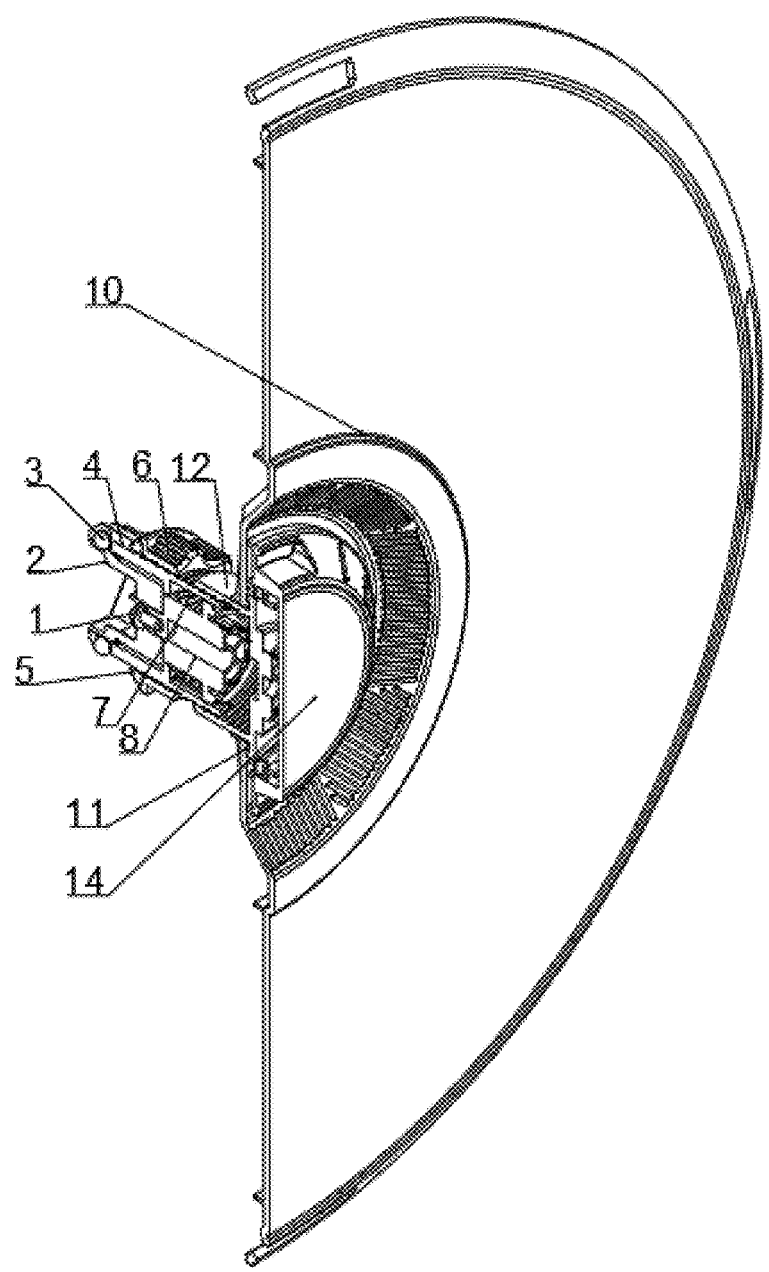
FIG. 4 is a schematic view of the sectional effect of the integral structure of the hubcap central locking mechanism in the preferred embodiment of the present disclosure.
Figure 5:
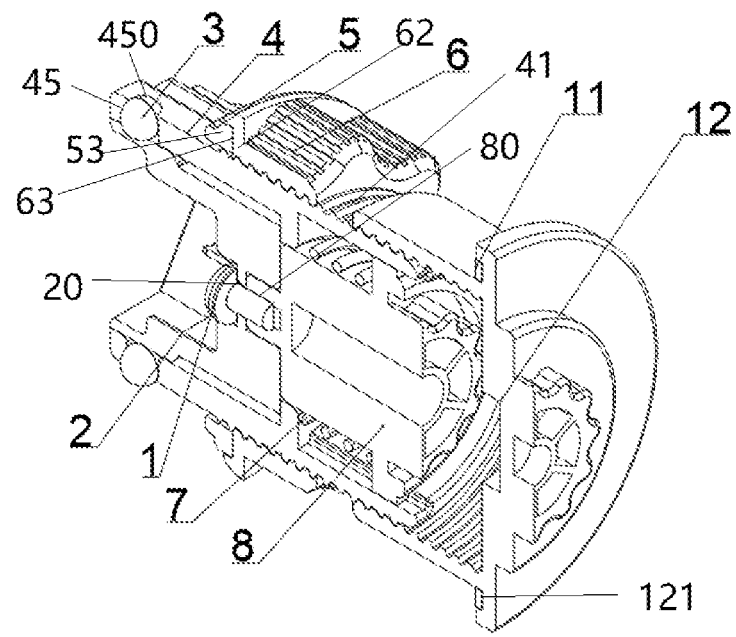
FIG. 5 is a schematic view of the sectional effect of a hubcap central locking mechanism in the preferred embodiment of the present disclosure.
Figure 6:
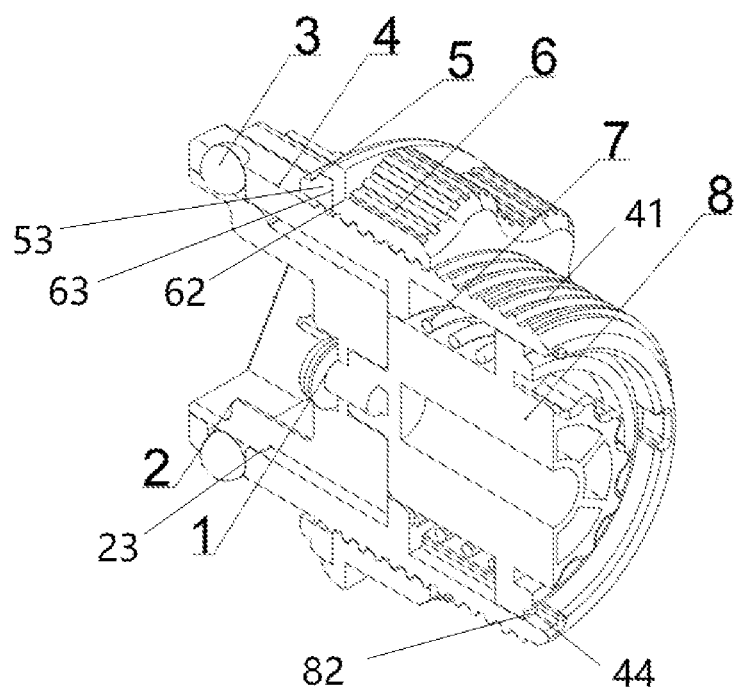
FIG. 6 is a schematic diagram of sectional effect of a hubcap central locking mechanism in the preferred embodiment of the present disclosure.

DESCRIPTION OF REFERENCE NUMBER IN THE DRAWINGS 1. screw; 2. outer supporting member; 3. clamping bead; 4. primary member of central locking module; 5. wheel hub silicone gasket; 6. locking member of central locking mechanism; 7. spring; 8. interlinked pressing member; 9. tire silicone rubber strip; 10. hubcap; 11. hubcap silicone gasket; 12. hubcap locking member; 13. tool wrench; 14. decorative cover.

DETAILED DESCRIPTIONS

The technical scheme in the embodiment of this present disclosure will be described clearly and completely with the attached drawings. Obviously, the described embodiment is only a part of the embodiment of this present disclosure, but not the whole embodiment. Based on the embodiment of the present disclosure, all other embodiments obtained by ordinary technicians in the field without creative labor belong to the protection scope of the present disclosure.

Embodiment 1

Please refer to FIG. 1-FIG. 6. The purpose of this embodiment is to provide a technical scheme. A hubcap central locking mechanism includes a hubcap 10, a hubcap locking member 12 and a decorative cover 14. the hubcap 10 comprises a built-in screw 1, the screw 1 is in threaded connection with an interlinked pressing member 8 for fixedly installing an outer supporting member 2; a primary member of the central locking mechanism 4 is installed on the outer surface of a side wall of the outer supporting member 2, a plurality of clamping bead holes 45 used for placing clamping beads 3 are set at the bottom edge of the inner wall of the primary member of the central locking mechanism 4, and a side wall of the primary member of the central locking mechanism 4 is provided with threads 41 for spirally installing the locking member of central locking mechanism 6, a wheel hub silicone gasket 5 is installed at the bottom of the locking member of central locking mechanism 6, and a spring 7 is installed around the interlinked pressing member 8.

The inner edge of the hubcap 10 is provided with four annular grooves, and one or more tire silicone strips 9 are placed in the grooves 9a for increasing friction between the hubcap 10 and a tire or a wheel hub, so as to prevent the hubcap 10 from rotating during the rapid speeding of an automobile.

The side of the hubcap locking member 12 is provided with another annular groove 121, and a hubcap silicone gasket 11 is placed in the annular groove 121 to increase the friction between the hubcap locking member 12 and the hubcap 10 and prevent the thread from loosening when the tire vibrates.

A circular hole 63 is formed at the bottom edge 62 of the locking member of the central locking mechanism 6, and a circular protrusion 53 is formed at the top edge of the wheel hub silicone gasket 5 to match the circular hole 63, and the wheel hub silicone gasket 5 is used for increasing the pre-tightening force between the locking member of the central locking mechanism 6 and the thread 41 on the side wall of the primary member of the central locking mechanism 4, making the meshing between the threads more closely fitted, reducing the clearance, and increasing the friction with a wheel hub.

An annular flange is provided at the bottom of the hubcap locking member 12, and a round through hole is provided at the center of the hubcap 10.

The number of the clamping beads 3 is six, and the bottom of the inner wall of the primary member of the central locking mechanism 4 is provided with six corresponding clamping bead holes 45, and the clamping bead holes 45 are provided with arc-shaped openings 450, and the diameter of the holes 45 is smaller than that of the clamping beads 3, and the clamping beads 3 are held in the clamping bead holes 45 on the inner wall of the primary member of the central locking mechanism 4 by the outer supporting member 2.

The spring 7 is used to enable the outer supporting member 2 and the interlinked pressing member 8 to rebound, and during the process of rebounding, the outer supporting member 2 will seal the six clamping bead holes 45 on the inner wall of the primary member of the central locking mechanism 4, so that the clamping bead 3 has no room for retraction and abuts against the clamping beads to prevent the clamping beads from retracting, as a result the hubcap central locking mechanism get stuck in shaft holes on a shaft of a wheel hub.

An annular-arc-shaped protrusion 23 is form on the outer surface of the outer supporting member 2 for pushing the clamping beads 3 into the clamping bead holes 45 on the inner wall of the primary member of the central locking mechanism 4.

A chute 44 is provided on the top end of the inner wall of the primary member of the central locking mechanism 4, and the chute is configured to fit the rectangular protrusion on the side wall of the interlinked pressing member 8 and is used for fixing the position of the interlinked pressing member 8 in the primary member of the central locking mechanism 4 and driving the primary member of the central locking mechanism 4 to rotate together with the interlinked pressing member 8 when the interlinked pressing member 8 is rotated.

A threaded hole 80 is provided at the center of the bottom of the interlinked pressing member 8, and a threaded through hole 20 is provided at the center of the inner part of the outer supporting member 2 for screwing the screw 1 and enabling it to pass through the threaded through hole 20 and screw together with the interlinked pressing member 8.

Instruction and principle: When the assembled hubcap central locking mechanism is installed into position of the shaft hole of the shaft of the wheel hub of a automobile, some structural movements will occur. Firstly, because the outer supporting member 2 is fixed with the interlinked pressing member 8 by the screw 1, the interlinked pressing member 8 can be pressed to drive the outer supporting member 2 to move downwards. After pressed to the bottom, the outer supporting member 2 does not seal the six bead holes on the inner wall of the primary member of the central locking mechanism 4 at present, so that the clamping beads 3 have space for retraction. Therefore, in the process of installing the hubcap central locking mechanism to a shaft of a wheel hub, when the clamping beads 3 arrive at the shaft hole of the shaft of the wheel hub, the retraction of the six clamping beads will happen. After the hubcap central locking mechanism is put into the shaft hole of the shaft of the wheel hub to the bottom, the interlinked pressing member 8 will be released, and the interlinked pressing member 8 and the outer supporting member 2 will return to their original positions under the elastic force of the spring 7. Because the outer supporting member 2 has an annular-arc-shaped protrusion 23, the outer supporting member 2 will push the clamping beads 3 into the six locking hole positions on the inner wall of the primary member of the central locking mechanism 4. And after returning to the original position, it will close the six locking pin holes on the inner wall of the primary member of the central locking mechanism 4, so that the clamping bead 3 has no room for retraction and the outer supporting member 2 abuts against the clamping beads 3 to prevent the clamping beads 3 from retracting, and the clamping beads 3 is closely attached to the inner wall of the shaft hole of the shaft of the wheel hub, so that the hubcap central locking mechanism can get stuck in the shaft hole of the hub.

Because the inner wall of the primary member of the central locking mechanism 4 is provided with a chute 44, and the side wall of the interlinked pressing member 8 is provided with a rectangular protrusion which is configured to fit with the chute 44, the interlinked pressing member 8 is fixed inside the primary member of the central locking mechanism 4. When the interlinked pressing member 8 is rotated with the tool wrench 13, and the outer supporting member 2 rotates together with the primary member of the central locking mechanism 4, and the locking member of central locking mechanism 6 is sleeved on the thread 41 of the side wall of the primary member of the central locking mechanism 4. The user fixes the locking member of central locking mechanism 6 with one hand and screws the interlinked pressing member 8 with the other hand using the tool wrench 13. At the same time, the primary member of the central locking mechanism 4 is driven to rotate, so that the locking member of central locking mechanism 6 can be screwed on the primary member of the central locking mechanism 4, the side of the locking member of central locking mechanism 6 is provided with an annular groove, and the wheel hub silicone gasket 5 is placed in the annular groove, and the hubcap silicone gasket 5 is used for increasing the pre-tightening force between the locking member of the central locking mechanism 6 and the thread 41 on the side wall of the primary member of the central locking mechanism 4, making the meshing between the threads more closely fitted, reducing the clearance, and increasing the friction with a wheel hub. So that the tire is not easy to loosen in the process of high-speed driving vibration, the locking member of the central locking mechanism 6 is fixed by one hand, and the interlinked pressing member 8 is continuously rotated by the other hand with the tool wrench 13 until it is tightened, so that the locking member of the central locking mechanism 6 is firmly attached to the outer port of the shaft hole of the shaft of the wheel hub, and at this time, the entire hubcap central locking mechanism is completely installed.

After the hubcap center lock is fixed to the wheel hub, the hubcap 10 is aligned with the hubcap central locking mechanism. Because the central positions of the hubcap 10 and the hubcap locking member 12 are both provided with annular flanges, the inner side of the hubcap 10 is closely attached to the top of the locking member of central locking mechanism 6, and the outer side is fixed by the annular flanges of the hubcap locking member 12. The inner wall of the hubcap locking member 12 is provided with threads, which are screwed on the center primary member of the central locking module 4, and the hubcap locking member 12 is rotated by a tool wrench 13, in order to fix the hubcap 10 firmly on a tire or a wheel hub. The inner wall of the hubcap 10 is provided with four circular grooves for placing the tire silicone rubber strip 9, so as to increase the friction between the hubcap 10 and the tire or the wheel hub and prevent the hubcap 10 from rotating during the rapid speeding of an automobile. The bottom of the hubcap locking member 12 is provided with a circular groove to receive the hubcap silicone gasket 11, so as to increase the friction between the hubcap locking member 12 and the hubcap 10 and prevent the thread from loosening when the tire vibrates. Finally, the decorative cover 14 is fixed on the hubcap 10 by means of a rotating buckle, so that the entire product can be assembled.

Embodiment 2

Figure 7:
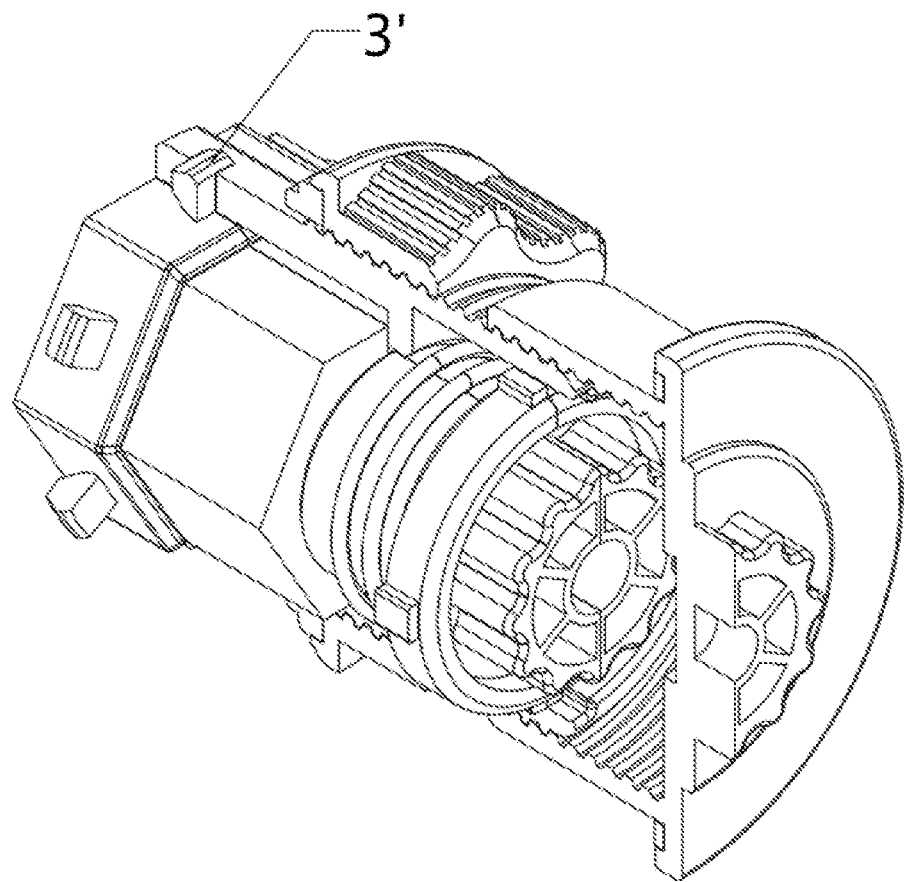
FIG. 7 is a schematic view of a hubcap central locking mechanism according to another embodiment of the present disclosure.
Figure 8:
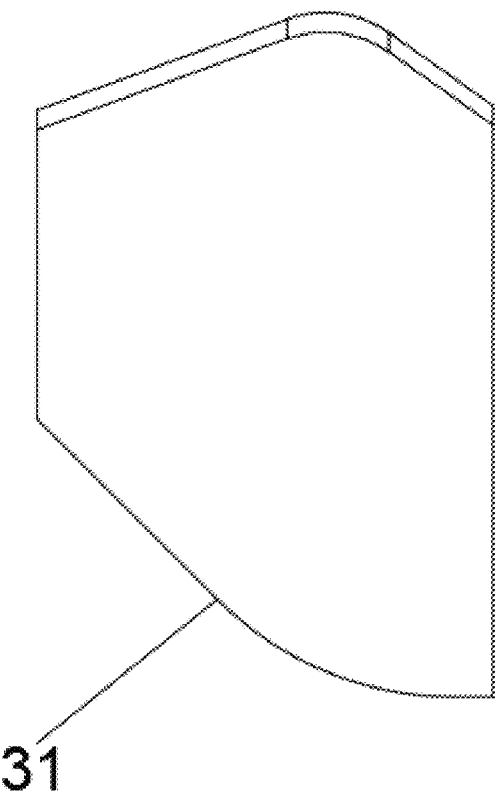
FIG. 8 is an enlarged view of the clamping bead of the hubcap central locking mechanism shown in FIG. 7.

As shown in FIG. 7 and FIG. 8, the difference between the present embodiment and the Embodiment 1 lies in that the shape of the clamping bead 3' is different. In Embodiment 1, the clamping bead 3 is in the shape of a round bead, while in this embodiment, the clamping bead 3' is in an irregular shape, and the side surface 31 of the clamping bead 3' facing the outer supporting member 2 is an arc surface. This arrangement can push the clamping bead 3 to attach against the inner wall of the shaft hole of the shaft of the wheel hub when it is squeezed by the outer supporting member 2.

The above is only the preferred embodiment of the present disclosure, and it does not restrict the present disclosure in any form. Although the present disclosure has been disclosed in the preferred embodiment, it is not intend to limit the present disclosure. Any person skilled in the art can make some changes or modify it into an equivalent embodiment by using the technical content disclosed above without departing from the technical solution of the present disclosure. According to the technical essence of the present disclosure, any brief modifications, equivalent changes and modifications of the above embodiments still fall within the scope of the technical scheme of the present disclosure.

What is claimed is:

1. A hubcap central locking mechanism comprises a hubcap (10), a hubcap locking member (12) and a decorative cover (14), wherein the hubcap (10) comprises a screw (1), the screw (1) is in threaded connection with an interlinked pressing member (8) for fixedly installing an outer supporting member (2); a primary member of the central locking mechanism (4) is installed on a radially outer surface of a side wall of the outer supporting member (2), a plurality of clamping bead holes used for placing clamping beads (3) are set at a radially outboard bottom edge of an axially inner wall of the primary member of the central locking mechanism (4), and a side wall of the primary member of the central locking mechanism (4) is provided with threads for spirally installing a locking member of the central locking mechanism (6), a wheel hub silicone gasket (5) is installed at an axially outer bottom of the locking member of the central locking mechanism (6), and a spring (7) is installed in a middle space between an axially inner bottom of the interlinked pressing member (8) and an axially outer top of the outer supporting member (2).

2. The hubcap central locking mechanism according to claim 1, wherein an axially inner edge of the hubcap (10) is provided with four annular grooves, and one or more tire silicone strips (9) are placed in the grooves for increasing friction between the hubcap (10) and a tire or a wheel hub, so as to prevent the hubcap (10) from rotating during the rapid speeding of an automobile.

3. The hubcap central locking mechanism according to claim 2, wherein an axially outboard side of the hubcap locking member (12) is provided with an annular groove, and a hubcap silicone gasket (11) is placed in the annular groove to increase the friction between the hubcap locking member (12) and the hubcap (10) and prevent the thread of the primary member of the central locking mechanism from loosening when the tire vibrates.

4. The hubcap central locking mechanism according to claim 1, wherein a circular hole is formed at an axially outer bottom edge of the locking member of the central locking mechanism (6), and a circular protrusion is formed at an axially outer top edge of the wheel hub silicone gasket (5) to match the circular hole, and the wheel hub silicone gasket (5) is used for increasing the pre-tightening force between the locking member of the central locking mechanism (6) and the thread on the side wall of the primary member of the central locking mechanism (4), making the meshing between the threads more closely fitted, reducing the clearance, and increasing the friction with a wheel hub.

5. The hubcap central locking mechanism according to claim 1, wherein the number of the clamping beads (3) is six, and a radially inboard bottom of the inner wall of the primary member of the central locking mechanism (4) is provided with six corresponding clamping bead holes, and the clamping bead holes are provided with arc-shaped openings, and the diameter of the holes is smaller than that of the clamping beads (3), and the clamping beads (3) are held in the clamping bead holes on the inner wall of the primary member of the central locking mechanism (4) by the outer supporting member (2).

6. The hubcap central locking mechanism according to claim 5, wherein an annular-arc-shaped protrusion is formed on a radially outer surface of the outer supporting member (2) for pushing the clamping beads (3) into the clamping bead holes of the primary member of the central locking mechanism (4).

7. The hubcap central locking mechanism according to claim 5, wherein the spring (7) is used to enable the outer supporting member (2) and the interlinked pressing member (8) to rebound, and during the process of rebounding, the outer supporting member (2) will seal the six clamping bead holes of the primary member of the central locking mechanism (4), so that the clamping bead (3) has no room for retraction and the outer supporting member (2) abuts against the clamping beads to prevent the clamping beads from retracting.

8. The hubcap central locking mechanism according to claim 7, wherein an annular-arc-shaped protrusion is form on a radially outer surface of the outer supporting member (2) for pushing the clamping beads (3) into the clamping bead holes of the primary member of the central locking mechanism (4).

9. The hubcap central locking mechanism according to claim 1, wherein a chute is provided on a axially inboard top end of the inner wall of the primary member of the central locking mechanism (4), and the chute is configured to fit a rectangular protrusion on a radially outboard side wall of the interlinked pressing member (8) and is used for fixing the position of the interlinked pressing member (8) in the primary member of the central locking mechanism (4) and driving the primary member of the central locking mechanism (4) to rotate together with the interlinked pressing member (8) when the interlinked pressing member (8) is rotated.

10. The hubcap central locking mechanism according to claim 1, wherein a threaded hole is provided at an axially inner center of the bottom of the interlinked pressing member (8), and a threaded through hole is provided at an axially inner center of an inner part of the outer supporting member (2) for screwing the screw (1) and enabling it to pass through the threaded through hole and screw together with the interlinked pressing member (8).

* * * * *